United States Patent
Lee et al.

(10) Patent No.: US 12,463,251 B2
(45) Date of Patent: Nov. 4, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 649 days.

(21) Appl. No.: 17/776,673

(22) PCT Filed: Jul. 8, 2021

(86) PCT No.: PCT/KR2021/008706
§ 371 (c)(1),
(2) Date: May 13, 2022

(87) PCT Pub. No.: WO2022/010281
PCT Pub. Date: Jan. 13, 2022

(65) Prior Publication Data
US 2022/0399572 A1    Dec. 15, 2022

(30) Foreign Application Priority Data

Jul. 9, 2020   (KR) .................... 10-2020-0084419
Jul. 7, 2021   (KR) .................... 10-2021-0089129

(51) Int. Cl.
| | | |
|---|---|---|
| *H01M 10/0567* | (2010.01) | |
| *H01M 4/02* | (2006.01) | |
| *H01M 4/505* | (2010.01) | |
| *H01M 4/525* | (2010.01) | |
| *H01M 10/0525* | (2010.01) | |
| *H01M 10/0569* | (2010.01) | |

(52) U.S. Cl.
CPC ... *H01M 10/0567* (2013.01); *H01M 10/0525* (2013.01); *H01M 10/0569* (2013.01); *H01M 2004/028* (2013.01); *H01M 4/505* (2013.01); *H01M 4/525* (2013.01); *H01M 2300/0025* (2013.01)

(58) Field of Classification Search
CPC ......... H01M 10/0567; H01M 10/0525; H01M 10/0569; H01M 4/505; H01M 4/525; H01M 2004/028; H01M 2300/0025; H01M 10/4235; H01M 2300/0037; Y02E 60/10
See application file for complete search history.

(56) References Cited

U.S. PATENT DOCUMENTS

| | | |
|---|---|---|
| 2008/0020287 A1 | 1/2008 | Cho et al. |
| 2008/0102369 A1 | 5/2008 | Sakata et al. |
| 2010/0035146 A1 | 2/2010 | Fujii et al. |
| 2012/0196191 A1 | 8/2012 | Jeon et al. |
| 2012/0202124 A1 | 8/2012 | Jeon et al. |
| 2012/0231330 A1 | 9/2012 | Fujii et al. |
| 2012/0251893 A1 | 10/2012 | Sakata et al. |
| 2013/0337318 A1 | 12/2013 | Fujii et al. |
| 2014/0178757 A1 | 6/2014 | Sakata et al. |
| 2015/0162644 A1 | 6/2015 | Fujii et al. |
| 2015/0333372 A1 | 11/2015 | Cho et al. |
| 2017/0069934 A1 | 3/2017 | Kim et al. |
| 2018/0183104 A1 | 6/2018 | Fujii et al. |
| 2020/0099098 A1 | 3/2020 | Wang et al. |
| 2021/0028489 A1 | 1/2021 | Wang et al. |
| 2021/0234196 A1 | 7/2021 | Peng et al. |
| 2021/0408547 A1 | 12/2021 | Wang |
| 2022/0407108 A1 | 12/2022 | Wang et al. |

FOREIGN PATENT DOCUMENTS

| | | | |
|---|---|---|---|
| CN | 107919498 A | 4/2018 | |
| CN | 108598488 A | 9/2018 | |
| CN | 109461967 A | 3/2019 | |
| CN | 109473713 A | 3/2019 | |
| CN | 109585920 A | 4/2019 | |
| CN | 109786834 A | 5/2019 | |
| CN | 110048164 A | 7/2019 | |
| CN | 110165219 A | 8/2019 | |
| CN | 110265716 * | 9/2019 | ........ H01M 10/0525 |

(Continued)

OTHER PUBLICATIONS

Ree, Electrolyte Addiitve for Improved Lithium-Battery Performance and Overcharge Protection, Current Opinion in Electrochemistry 2020, 21:22-30 (Year: 2020).*
International Search Report for PCT/KR2021/008706 dated Nov. 1, 2021. 3 pgs.
Extended European Search Report including Written Opinion for Application No. 21837153.2 dated Sep. 25, 2023, pp. 1-9.
Search Report dated Feb. 26, 2024 from the Office Action for Chinese Application No. 202180006302.8 issued Mar. 7, 2024, 2 pages.

*Primary Examiner* — Helen Oi K Conley
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution for a lithium secondary battery includes a lithium salt, an organic solvent containing a carbonate compound and a propionate compound, a first additive containing a compound represented by the following Formula 1, and a second additive containing 1,3,6-hexanetricarbonitrile, wherein the first additive and the second additive are present in a weight ratio of 1:1.1 to 1:5.5, NC—R—CH=CH—R—CN   [Formula 1]

wherein, in Formula 1,
R is an unsubstituted or substituted alkylene group having 1 to 5 carbon atoms.

13 Claims, No Drawings

(56) References Cited

FOREIGN PATENT DOCUMENTS

| | | | |
|---|---:|---|---|
| CN | 110718715 | A | 1/2020 |
| EP | 3627606 | A1 | 3/2020 |
| JP | 2006073513 | A | 3/2006 |
| JP | 6315083 | B2 | 4/2018 |
| KR | 20090095577 | A | 9/2009 |
| KR | 100941299 | B1 | 2/2010 |
| KR | 20120059436 | A | 6/2012 |
| KR | 101477724 | B1 | 12/2014 |
| KR | 20170028143 | A | 3/2017 |
| KR | 20180023567 | A | 3/2018 |
| KR | 20190054920 | A | 5/2019 |
| KR | 20190057925 | A | 5/2019 |
| WO | 2020244260 | A1 | 12/2020 |

\* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2021/008706, filed on Jul. 8, 2021, which claims priority from Korean Patent Application Nos. 10-2020-0084419, filed on Jul. 9, 2020, and 10-2021-0089129, filed on Jul. 7, 2021, the disclosures of which are incorporated by reference herein.

TECHNICAL FIELD

The present invention relates to a non-aqueous electrolyte solution for a lithium secondary battery, which may form a stable film on a surface of an electrode, and a lithium secondary battery including the same.

BACKGROUND ART

There is a need to develop technology for efficiently storing and utilizing electrical energy as personal IT devices and computer networks are developed with the recent development of information society and the accompanying dependency of society as a whole on the electrical energy is increased.

Among the technologies developed, a technology based on secondary batteries is the most suitable technology for various applications.

Particularly, lithium secondary batteries have been used in electric vehicles and power storage devices as well as power sources of notebook computers and mobile phones in view of the fact that the lithium secondary batteries may be miniaturized to be applicable to a personal IT device in comparison to a lead battery or nickel-cadmium battery, have high energy density and operating voltage, and may have high capacity.

Transition metal ions may be dissolved into a non-aqueous electrolyte solution by a side reaction between the non-aqueous electrolyte solution and a positive electrode or gas may be generated while a film formed on a surface of the electrode degrades when the lithium secondary battery was operated under high-voltage and high-temperature conditions. This phenomenon is intensified when the voltage increases or the storage temperature increases.

Thus, research and development of various methods capable of removing a cause of high-voltage and high-temperature operation degradation by forming a robust film on the surface of the electrode are being attempted.

DISCLOSURE OF THE INVENTION

Technical Problem

An aspect of the present invention provides a non-aqueous electrolyte solution for a lithium secondary battery which includes two types of nitrile-based compounds having a specific structure capable of forming a robust film on a surface of a positive electrode.

Another aspect of the present invention provides a lithium secondary battery in which cell swelling during high-temperature storage is low and capacity characteristics are improved by including the non-aqueous electrolyte solution for a lithium secondary battery.

Technical Solution

According to an aspect of the present invention, there is provided a non-aqueous electrolyte solution for a lithium secondary battery which includes:
a lithium salt,
an organic solvent containing a carbonate compound and a propionate compound,
a first additive containing a compound represented by Formula 1, and
a second additive containing 1,3,6-hexanetricarbonitrile,
wherein the first additive and the second additive are present in a weight ratio of 1:1.1 to 1:5.5.

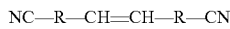
[Formula 1]

wherein, in Formula 1,
R is an unsubstituted or substituted alkylene group having 1 to 5 carbon atoms.

Specifically, the compound represented by Formula 1 may be 1,4-dicyano-2-butene (DCB).

The compound represented by Formula 1 may be included in an amount of 0.01 wt % to 2.5 wt % based on a total weight of the non-aqueous electrolyte solution.

According to another aspect of the present invention, there is provided a lithium secondary battery including: a positive electrode including a positive electrode active material; a negative electrode including a negative electrode active material; a separator disposed between the negative electrode and the positive electrode; and the non-aqueous electrolyte solution for a lithium secondary battery of the present invention.

Advantageous Effects

Since a non-aqueous electrolyte solution of the present invention includes 1,3,6-hexanetricarbonitrile and a compound represented by Formula 1 containing two or more nitrile groups (—CN) in its structure, it may form a robust film on a surface of a positive electrode to prevent a side reaction between the positive electrode and the electrolyte solution and prevent collapse of the positive electrode, and thus, dissolution of transition metal from the positive electrode may be effectively controlled.

The non-aqueous electrolyte solution of the present invention may suppress gas generation at high voltage by decreasing an amount of a carbonate compound, which is easily decomposed at high voltage, among organic solvent components.

Thus, if the non-aqueous electrolyte solution of the present invention is used, a lithium secondary battery, in which cell swelling is suppressed during high-voltage operation and high-temperature storage and capacity characteristics are improved, may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium secondary battery, a film having passivation ability is formed on surfaces of a negative electrode and a positive electrode, while a non-aqueous electrolyte solution is decomposed during initial charge and discharge, to improve high-temperature storage characteristics. However, since metallic elements are lost due to dissolution of transition metal elements from the positive electrode while the film degrades during high-voltage operation and high-temperature storage, discharge capacity may decrease. Also, since the transition metal ions thus dissolved are not only electrodeposited on the negative electrode reacting in a strong reduction potential range to consume electrons, but also destruct the film on the surface of the negative electrode, electrolyte decomposition for regeneration of a solid electrolyte interphase (SEI) and additional consumption of electrons and lithium ions are caused. As a result, resistance may be increased, and capacity of a cell may be continuously reduced while irreversible capacity is increased.

Thus, the present invention aims at providing a non-aqueous electrolyte solution for a secondary battery which includes a non-aqueous electrolyte solution additive capable of reducing an amount of metallic impurities in the battery by preventing the dissolution of transition metals and suppressing a side reaction between the positive electrode and the electrolyte solution through the formation of a stable film on the surface of the positive electrode. Also, the present invention aims at providing a lithium secondary battery in which capacity characteristics are improved and cell swelling during high-temperature storage is suppressed by including the non-aqueous electrolyte solution.

Non-Aqueous Electrolyte Solution for Lithium Secondary Battery

According to an embodiment, the present invention provides a non-aqueous electrolyte solution for a lithium secondary battery.

The non-aqueous electrolyte solution for a lithium secondary battery includes:
a lithium salt,
an organic solvent containing a carbonate compound and a propionate compound,
a first additive containing a compound represented by Formula 1 below, and
a second additive containing 1,3,6-hexanetricarbonitrile (HTCN),
wherein the first additive and the second additive are present in a weight ratio of 1:1.1 to 1:5.5.

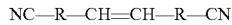   [Formula 1]

In Formula 1,
R is an unsubstituted or substituted alkylene group having 1 to 5 carbon atoms.

(1) Lithium Salt

First, a lithium salt will be described as follows.

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (lithium bis(fluorosulfonyl)imide, LiFSI), $LiN(SO_2CF_2CF_3)_2$ (lithium bis(pentafluoroethanesulfonyl)imide, LiBETI), and $LiN(SO_2CF_3)_2$ (lithium bis(trifluoromethanesulfonyl)imide, LiTFSI), or a mixture of two or more thereof, and, in addition to the above-described lithium salt, any lithium salt commonly used in an electrolyte solution of a lithium secondary battery may be used without limitation. Specifically, the lithium sat may include $LiBF_6$.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of a surface of an electrode. In a case in which the concentration of the lithium salt satisfies the above range, viscosity of the non-aqueous electrolyte solution may be controlled so that optimum impregnability may be achieved, and an effect of improving capacity characteristics and cycle characteristics of the lithium secondary battery may be obtained by improving mobility of lithium ions.

(2) Organic Solvent

An organic solvent will be described as follows.

The organic solvent may include a carbonate compound and a propionate compound.

Specifically, the carbonate compound may include at least one selected from a cyclic carbonate compound and a linear carbonate compound.

The cyclic carbonate compound is an organic solvent which may well dissociate the lithium salt in an electrolyte due to high permittivity as a highly viscous organic solvent, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate compound may include at least one selected from ethylene carbonate and propylene carbonate which may improve output characteristics by increasing ionic conductivity.

Also, the linear carbonate compound is an organic solvent having low viscosity and low permittivity, wherein typical examples thereof may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and, among them, the linear carbonate compound may include dimethyl carbonate.

Furthermore, in the present invention, in order to improve disadvantages of the carbonate compound, a propionate compound having relatively higher stability during high-temperature and high-voltage operation than the carbonate compound may be mixed.

The propionate compound may include at least one selected from the group consisting of methyl propionate, ethyl propionate (EP), propyl propionate, and butyl propionate, and may specifically include at least one selected from ethyl propionate and propyl propionate.

The carbonate compound and the propionate compound may be included in a volume ratio of 10:90 to 40:60, specifically 20:80 to 40:60, and preferably 30:70.

The volume ratio of the carbonate compound to the propionate compound may have a significant effect on improving both capacity and cycle characteristics at high temperature and room temperature during the preparation of the secondary battery. Thus, in a case in which the volume ratio of the carbonate compound to the propionate compound satisfies the above range, a synergistic effect due to the mixed use of the two organic solvents may be achieved. For example, in a case in which the carbonate compound and the propionate compound are present within the above range, high-temperature storage stability may be improved at a high voltage of 4.45 V or more and during storage at a high temperature of 60° C. or more, and simultaneously, the cycle characteristics and the capacity characteristics may be sufficiently improved by securing high ionic conductivity of the electrolyte solution.

Since the carbonate compound is sensitive to the side reaction due to high reactivity at high voltage, gas generation is increased in a case in which an excessive amount of the carbonate compound is used as a non-aqueous solvent when used in a high-voltage battery, and thus, the cell swelling is increased and the high-temperature storage stability may be decreased. Thus, in the case that the carbonate compound and the propionate compound are present within the above range, electrolyte wetting may be improved by suppressing an increase in viscosity of the electrolyte, and an oxidation reaction of the carbonate compound may be decreased to further improve cell stability at high voltage and swelling inhibition performance. Particularly, as the propionate compound is present at a desired level, ionic conductivity of lithium ions may be improved, a stable SEI passivation film may be formed, and safety of the cell may be improved.

(3) First Additive

The non-aqueous electrolyte solution for a lithium secondary battery of the present invention may include two types of nitrile-based compounds as an additive.

Among them, a compound represented by the following Formula 1 may be included as a first additive.

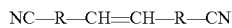   [Formula 1]

In Formula 1,

R is an unsubstituted or substituted alkylene group having 1 to 5 carbon atoms.

Specifically, in Formula 1, R may be an unsubstituted or substituted alkylene group having 1 to 3 carbon atoms. More specifically, the compound represented by Formula 1 may be 1,4-dicyano-2-butene (DCB).

Since the compound represented by Formula 1, particularly, 1,4-dicyano-2-butene (DCB) contains at least one polar nitrile group (—CN) having a high dipole moment at both ends, it may not only form a stable film by forming a strong bond with a positive electrode active material, but may also achieve an effect of suppressing metal ion dissolution due to a high binding force with the dissolved metal ions. Furthermore, since the compound represented by Formula 1 contains a double bond in the middle of its structure in comparison to succinonitrile or adiponitrile, a conventional nitrile-based compound, it may form a very stable ion conductive film by more easily forming a film in the form of an organic polymer through oxidative decomposition of the double bond and simultaneously forming a complex structure or ligand by strong binding with the metal ions on the surface of the positive electrode. Thus, a side reaction between the electrolyte and the positive electrode may be prevented, and gas generation may be suppressed. Furthermore, in addition to the metal ion adsorption effect as described above, since an unshared electron pair of nitrogen (N) of the nitrile group in the compound represented by Formula 1 stabilizes the anion of the lithium salt to suppress generation of HF due to the decomposition of the lithium salt, the compound represented by Formula 1 may further improve high-temperature storage characteristics of the secondary battery.

The compound represented by Formula 1 may be included in an amount of 0.01 wt % to 2.5 wt % based on a total weight of the non-aqueous electrolyte solution for a lithium secondary battery.

In a case in which the compound represented by Formula 1 is present in an amount within the above range, a stable film may be formed on the surface of the positive electrode to obtain a high effect of suppressing metal ion dissolution from the positive electrode, and a stable film may be formed on the surfaces of the negative electrode and the positive electrode to obtain a high effect of suppressing the gas generation due to the side reaction between the positive electrode and the electrolyte solution and the resulting cell swelling. Thus, the battery stability during high-temperature storage, the cell swelling, and the capacity characteristics may be further improved.

The compound represented by Formula 1 may specifically be included in an amount of 0.05 wt % to 2.0 wt %, particularly 0.5 wt % to 2.0 wt %, and more particularly 1.0 wt % to 2.0 wt % based on the total weight of the non-aqueous electrolyte solution for a lithium secondary battery, and, in a case in which the amount of the compound represented by Formula 1 is 0.05 wt % or more, a metallic foreign matter removal effect may be more stably maintained during battery operation time. Also, in a case in which the amount of the compound represented by Formula 1 is 2.0 wt % or less, degradation of the capacity and cycle characteristics may be prevented because an increase in viscosity of the electrolyte solution caused by the surplus compound may be prevented, mobility of ions in the battery may be simultaneously improved, and an increase in battery resistance may be effectively prevented by suppressing excessive film formation.

(4) Second Additive

Also, the non-aqueous electrolyte solution for a lithium secondary battery of the present invention may include 1,3,6-hexanetricarbonitrile as a second additive.

Since the 1,3,6-hexanetricarbonitrile has very high binding affinity with ions of transition metals, such as cobalt (Co), manganese (Mn), or nickel (Ni), dissolved from the positive electrode due to a repeated charge and discharge process of the battery or chemical dissolution reaction of the electrolyte solution by containing three or more nitrile groups having a high dipole moment, the dissolution of the metal ions may be effectively suppressed by forming a stable film on the surface of the positive electrode by binding with the metal ions, and, furthermore, since the nitrile group has a structure that occupies a large volume, an ability to form a complex by binding with the dissolved metal ions is excellent, and thus, electrodeposition or precipitation on the surface of the negative electrode may be prevented. Therefore, since a change in thickness of the battery may be significantly reduced during the high-temperature storage and when a thermal shock is applied, thermal shock durability may be improved.

A mixing ratio of the 1,3,6-hexanetricarbonitrile to the compound represented by Formula 1 may have an important effect on improving overall performance of the secondary battery, and the compound represented by Formula 1 and the 1,3,6-hexanetricarbonitrile may specifically be included in a weight ratio of 1:1.1 to 1:5.5 in the non-aqueous electrolyte solution.

In a case in which the compound represented by Formula 1 and the 1,3,6-hexanetricarbonitrile are present in amounts within the above range, since a stable film is formed at a high voltage of 4.45 V or more and during storage at a high temperature of 60° C. or more, the metal dissolution from the positive electrode may be suppressed and the side reaction between the positive electrode and the electrolyte solution may be prevented, and thus, the gas generation caused by the side reaction between the positive electrode and the electrolyte solution and the cell swelling may be suppressed. Thus, the high-temperature storage stability may be improved. Furthermore, the transition metal dissolution suppression effect and the cycle characteristics and capacity characteristics of the secondary battery may be sufficiently improved while suppressing a decrease in capacity and an increase in resistance due to the side reaction as much as possible.

Specifically, the weight ratio of the compound represented by Formula 1 to the 1,3,6-hexanetricarbonitrile may be in a range of 1:1.1 to 1:5, particularly 1:1.5 to 1:4, and more particularly 1:2 to 1:3.

In a case in which the ratio of a weight of the 1,3,6-hexanetricarbonitrile to a weight of the compound represented by Formula 1 is 1.1 or more, since a stable film may be easily formed on the surfaces of the positive electrode and the negative electrode, the side reaction and the dissolution of the transition metals may be effectively suppressed, and the battery capacity and cycle characteristics may be improved. Also, in a case in which the ratio of the weight of the 1,3,6-hexanetricarbonitrile to the weight of the compound represented by Formula 1 is 5 or less, since a film having low resistance is formed on the positive electrode and the negative electrode, resistance may be reduced, lithium mobility may be improved, and the cycle characteristics may be improved.

A total amount of the first additive and the second additive may be in a range of 0.2 wt % to 8 wt %, for example 0.2 wt % to 6 wt % based on the total weight of the non-aqueous electrolyte solution.

In a case in which the total amount of the first additive and the second additive satisfies the above range, an increase in battery resistance may be suppressed by improving an effect of forming a film on the surface of the positive electrode and simultaneously preventing an excessive film forming reaction, and, as a result, since the lithium ion mobility may be improved, the cycle characteristics may be improved and a swelling phenomenon of the battery may be improved.

(5) Other Additives

Also, the non-aqueous electrolyte solution for a lithium secondary battery of the present invention may further include other additional additives in addition to the two types of nitrile-based additives, if necessary, in order to prevent the occurrence of the collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additive may be at least one selected from the group consisting of a cyclic carbonate-based compound, a halogen-substituted carbonate-based compound, a sultone-based compound, a sulfate-based compound, a phosphate-based or phosphite-based compound, a borate-based compound, a benzene-based compound, an amine-based compound, a silane-based compound, and a lithium salt-based compound.

The cyclic carbonate-based compound may include vinylene carbonate (VC) or vinyl ethylene carbonate (VEC).

The halogen-substituted carbonate-based compound may include fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro bis(oxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may include tetraphenylborate, and lithium oxalyldifluoroborate (LiODFB) or lithium bis(oxalato)borate (LiB$(C_2O_4)_2$, LiBOB) which may form a film on the surface of the negative electrode.

The benzene-based compound may be fluorobenzene, the amine-based compound may be triethanolamine or ethylenediamine, and the silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

Among these other additives, in order to form a more robust SEI on the surface of the negative electrode during an initial activation process, other additives having an excellent effect of forming a film on the surface of the negative electrode, specifically at least one selected from the group consisting of vinylene carbonate, vinylethylene carbonate, fluoroethylene carbonate (FEC), and lithium oxalyldifluoroborate (LiODFB) may be included.

Two or more compounds may be mixed and used as the other additives, and the other additives may be included in an amount of 0.01 wt % to 50 wt %, specifically 0.01 wt % to 10 wt %, and preferably 0.05 wt % to 5 wt % based on the total weight of the non-aqueous electrolyte solution. In a case in which the amount of the other additives is within the above range, it is desirable because the cycle characteristics are improved, the side reaction of the battery due to the excessive addition may be prevented, and precipitation or remaining of the unreacted material may be prevented.

The non-aqueous electrolyte solution of the present invention may be composed of the lithium salt, the organic solvent, the first additive, and the second additive. Specifically, the present invention provides a non-aqueous electrolyte solution capable of forming a more stable film on the surface of the electrode in order to prepare a lithium secondary battery with further improved capacity characteristics and suppressed cell swelling during high-temperature storage, and, for this purpose, the non-aqueous electrolyte solution of the present invention may not include a nitrile-based compound, such as succinonitrile, pimelonitrile, adiponitrile, and acetonitrile, in addition to the first and second additives.

Lithium Secondary Battery

Also, in another embodiment of the present invention, there is provided a lithium secondary battery including the non-aqueous electrolyte solution for a lithium secondary battery of the present invention.

Specifically, the lithium secondary battery may include a positive electrode, a negative electrode, and the above-described non-aqueous electrolyte solution for a lithium secondary battery. More specifically, the lithium secondary battery may include a positive electrode including a positive electrode active material, a negative electrode including a negative electrode active material, a separator disposed between the positive electrode and the negative electrode, and the above-described non-aqueous electrolyte solution for a lithium secondary battery.

After an electrode assembly, in which the positive electrode, the separator, and the negative electrode are sequentially stacked, is formed and accommodated in a battery case, the lithium secondary battery of the present invention may be prepared by injecting the non-aqueous electrolyte solution of the present invention.

The lithium secondary battery of the present invention may be prepared according to a conventional method known in the art and used, and a method of preparing the lithium secondary battery of the present invention is specifically the same as that described later.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may include a lithium transition metal oxide including lithium and at least one metal selected from cobalt, manganese, nickel, or aluminum.

Specifically, the positive electrode active material may include lithium-cobalt-based oxide (e.g., $LiCoO_2$, etc.), lithium-manganese-based oxide (e.g., $LiMnO_2$, $LiMn_2O_4$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$). $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included. Typical examples of the lithium-nickel-manganese-cobalt-based oxide may be at least one selected from the group consisting of $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$.

Among these materials, in terms of the improvement of capacity characteristics and stability of the battery, the positive electrode active material may include at least one selected from the group consisting of lithium-cobalt oxide, lithium-manganese-based oxide, and lithium-nickel-manganese-cobalt-based oxide, may specifically include at least one selected from lithium-cobalt oxide and lithium-nickel-manganese-cobalt-based oxide, and may more specifically include at least one selected from lithium-cobalt oxide and lithium-nickel-manganese-cobalt-based oxide in which a nickel content is 60 atm % or more.

When high nickel (Hi-Ni), in which a Ni content is greater than 0.55, is used as the lithium transition metal oxide, since sizes of a $Li^{+1}$ ion and a $Ni^{+2}$ ion are similar, a cation mixing phenomenon occurs in which positions of the $Li^{+1}$ ion and the $Ni^{+2}$ ion are exchanged in a layered structure of the positive electrode active material during a charge and discharge process. That is, a nickel transition metal having a d orbital in an environment, such as a high temperature, should have an octahedral structure during coordinate bonding according to a change in oxidation number of Ni included in the positive electrode active material, but deformation and collapse of a crystal structure of the positive electrode active material occur while a distorted octahedron is formed by a heterogenization reaction in which the oxidation number is changed or the order of energy levels is reversed by external energy supply. Furthermore, since another side reaction, in which a transition metal, particularly nickel metal is dissolved from the positive electrode active material, is caused by the side reaction between the positive electrode active material and the electrolyte solution during high-temperature storage, overall performance of the secondary battery is degraded due to the structural collapse of the positive electrode active material as well as the depletion of the electrolyte solution.

In the present invention, this problem may be improved by using the non-aqueous electrolyte solution containing an additive with a specific configuration and the positive electrode including a high nickel (Hi-Ni) transition metal oxide, as a positive electrode active material, together. That is, since a robust ion conductive film is formed on the surface of the positive electrode by the non-aqueous electrolyte solution of the present invention, the cation mixing phenomenon of the $Li^{+1}$ ion and the $Ni^{+2}$ ion is suppressed and the side reaction between the positive electrode and the electrolyte solution and the metal dissolution phenomenon are effectively suppressed, and thus, structural instability of the high-capacity electrode may be alleviated. Therefore, a sufficient amount of the nickel transition metal for ensuring the capacity of the lithium secondary battery may be secured, energy density may be increased to improve the output characteristics.

The positive electrode active material may be included in an amount of 80 wt % to 99 wt %, for example, 90 wt % to 99 wt % based on a total weight of solid content in the positive electrode slurry. In a case in which the amount of the positive electrode active material is 80 wt % or less, since the energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are present. For example, the solvent may be included in an amount such that a concentration of the solid content in the positive electrode slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder. In this case, the binder may be the same as or different from the binder included in the positive electrode.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are present. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Non-aqueous Electrolyte Solution for Lithium Secondary Battery Example 1

After dissolving $LiPF_6$ in 95.9 g of a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.2 M, a non-aqueous electrolyte solution for a lithium secondary battery was prepared by adding 1.0 g of 1,4-dicyano-2-butene (hereinafter, referred to as "DCB"), 1.1 g of 1,3,6-hexanetricarbonitrile (hereinafter, referred to as "HTCN"), and 1.0 g of vinyl ethylene carbonate (VEC) and 1.0 g of fluoroethylene carbonate (FEC), as other additives (see Table 1 below).

Example 2

A non-aqueous electrolyte solution for a lithium secondary battery was prepared in the same manner as in Example 1 except that, after dissolving $LiPF_6$ in 95 g of the non-aqueous organic solvent such that a concentration of the $LiPF_6$ was 1.2 M, 1.0 g of DCB, 2.0 g of HTCN, and 1.0 g of VEC and 1.0 g of FEC, as other additives, were added (see Table 1 below).

Example 3

A non-aqueous electrolyte solution for a lithium secondary battery was prepared in the same manner as in Example 1 except that, after dissolving $LiPF_6$ in 94 g of the non-aqueous organic solvent such that a concentration of the $LiPF_6$ was 1.2 M, 1.0 g of DCB, 3.0 g of HTCN, and 1.0 g of VEC and 1.0 g of FEC, as other additives, were added (see Table 1 below).

Example 4

A non-aqueous electrolyte solution for a lithium secondary battery was prepared in the same manner as in Example 1 except that, after dissolving $LiPF_6$ in 92.0 g of the non-aqueous organic solvent such that a concentration of the $LiPF_6$ was 1.2 M, 1.0 g of DCB, 5.0 g of HTCN, and 1.0 g of VEC and 1.0 g of FEC, as other additives, were added (see Table 1 below).

Comparative Example 1

A non-aqueous electrolyte solution for a lithium secondary battery was prepared in the same manner as in Example 1 except that, after dissolving $LiPF_6$ in 96 g of the non-aqueous organic solvent such that a concentration of the $LiPF_6$ was 1.2 M, 1.0 g of DCB, 1.0 g of HTCN, and 1.0 g of VEC and 1.0 g of FEC, as other additives, were added (see Table 1 below).

Comparative Example 2

A non-aqueous electrolyte solution for a lithium secondary battery was prepared in the same manner as in Example 1 except that, after dissolving $LiPF_6$ in 91 g of the non-aqueous organic solvent such that a concentration of the $LiPF_6$ was 1.2 M, 1.0 g of DCB, 6.0 g of HTCN, and 1.0 g of VEC and 1.0 g of FEC, as other additives, were added (see Table 1 below).

Comparative Example 3

A non-aqueous electrolyte solution for a lithium secondary battery was prepared in the same manner as in Example 1 except that, after dissolving $LiPF_6$ in 95 g of the non-aqueous organic solvent such that a concentration of the $LiPF_6$ was 1.2 M, 1.0 g of DCB, 1.0 g of HTCN, and 1.0 g of VEC, 1.0 g of FEC, and 1.0 g of SN, as other additives, were added (see Table 1 below).

Comparative Example 4

A non-aqueous electrolyte solution for a lithium secondary battery was prepared in the same manner as in Example 1 except that, after dissolving $LiPF_6$ in 96 g of the non-aqueous organic solvent such that a concentration of the $LiPF_6$ was 1.2 M, 1.0 g of DCB, and 1.0 g of VEC, 1.0 g of FEC, and 1.0 g of SN, as other additives, were added (see Table 1 below).

Comparative Example 5

A non-aqueous electrolyte solution for a lithium secondary battery was prepared in the same manner as in Example 1 except that, after dissolving $LiPF_6$ in 96 g of the non-aqueous organic solvent such that a concentration of the $LiPF_6$ was 1.2 M, 1.0 g of HTCN, and 1.0 g of VEC, 1.0 g of FEC, and 1.0 g of SN, as other additives, were added (see Table 1 below).

Comparative Example 6

A non-aqueous electrolyte solution for a lithium secondary battery was prepared in the same manner as in Example 1 except that, after dissolving $LiPF_6$ in 96 g of the non-aqueous organic solvent such that a concentration of the $LiPF_6$ was 1.2 M, 1.0 g of VEC, 1.0 g of FEC, 1.0 g of adiponitrile, and 1.0 g of SN, as other additives, were added (see Table 1 below).

Comparative Example 7

A non-aqueous electrolyte solution for a lithium secondary battery was prepared in the same manner as in Example 1 except that, after dissolving $LiPF_6$ in 96 g of the non-aqueous organic solvent such that a concentration of the $LiPF_6$ was 1.2 M, 1.0 g of DCB, and 1.0 g of VEC, 1.0 g of FEC, and 1.0 g of 1,3,5-cyclohexanetricarbonitrile (hereinafter, referred to as "CHTCN"), as other additives, were added (see Table 1 below).

Comparative Example 8

A non-aqueous electrolyte solution for a lithium secondary battery was prepared in the same manner as in Example 1 except that, after dissolving $LiPF_6$ in 95.0 g of the non-aqueous organic solvent such that a concentration of the $LiPF_6$ was 1.2 M, 1.0 g of DCB, and 1.0 g of VEC, 1.0 g of FEC, and 2.0 g of SN, as other additives, were added (see Table 1 below).

Comparative Example 9

A non-aqueous electrolyte solution for a lithium secondary battery was prepared in the same manner as in Example 1 except that, after dissolving $LiPF_6$ in 95.0 g of the non-aqueous organic solvent such that a concentration of the $LiPF_6$ was 1.2 M, 1.0 g of DCB, and 1.0 g of VEC, 1.0 g of FEC, and 2.0 g of 1,3,5-cyclohexanetricarbonitrile (hereinafter, referred to as "CHTCN"), as other additives, were added (see Table 1 below).

TABLE 1

| Examples | Non-aqueous organic solvent amount (g) | Additives DCB amount (g) | Additives HTCN amount (g) | Other additives Additives other than nitrile-based additives Type | Other additives Additives other than nitrile-based additives Amount (g) | Other additives Nitrile-based additives Type | Other additives Nitrile-based additives Amount (g) |
|---|---|---|---|---|---|---|---|
| Example 1 | 95.9 | 1.0 | 1.1 | VEC/FEC | 1.0/1.0 | — | — |
| Example 2 | 95 | 1.0 | 2.0 | VEC/FEC | 1.0/1.0 | — | — |
| Example 3 | 94 | 1.0 | 3.0 | VEC/FEC | 1.0/1.0 | — | — |
| Example 4 | 92 | 1.0 | 5.0 | VEC/FEC | 1.0/1.0 | — | — |
| Comparative Example 1 | 96 | 1.0 | 1.0 | VEC/FEC | 1.0/1.0 | — | — |
| Comparative Example 2 | 91 | 1.0 | 6.0 | VEC/FEC | 1.0/1.0 | — | — |
| Comparative Example 3 | 95 | 1.0 | 1.0 | VEC/FEC | 1.0/1.0 | SN | 1.0 |
| Comparative Example 4 | 96 | 1.0 | — | VEC/FEC | 1.0/1.0 | SN | 1.0 |
| Comparative Example 5 | 96 | — | 1.0 | VEC/FEC | 1.0/1.0 | SN | 1.0 |
| Comparative Example 6 | 96 | — | — | VEC/FEC | 1.0/1.0 | Adn SN | 1.0 1.0 |
| Comparative Example 7 | 96 | 1.0 | — | VEC/FEC | 1.0/1.0 | CHTCN | 1.0 |
| Comparative Example 8 | 95 | 1.0 | — | VEC/FEC | 1.0/1.0 | SN | 2.0 |
| Comparative Example 9 | 95 | 1.0 | — | VEC/FEC | 1.0/1.0 | CHTCN | 2.0 |

In Table 1, the abbreviation of each compound has the following meaning.
DCB: 1,4-dicyano-2-butene
HTCN: 1,3,6-hexanetricarbonitrile
SN: succinonitrile
FEC: fluoroethylene carbonate VEC: vinyl ethylene carbonate
CHTCN: 1,3,5-cyclohexanetricarbonitrile
Adn: adiponitrile II. Lithium Secondary Battery Preparation Example 5

A positive electrode active material (Li(Ni$_{0.8}$Mn$_{0.1}$Co$_{0.1}$)O$_2$), a conductive agent (carbon black), and a binder (polyvinylidene fluoride) were added to N-methyl-2-pyrrolidone (NMP) in a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (graphite), a binder (SBR-CMC), and a conductive agent (carbon black) were added to water, as a solvent, in a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles (Al$_2$O$_3$), and the negative electrode.

The electrode assembly was accommodated in a pouch-type battery case, and the non-aqueous electrolyte solution for a lithium secondary battery of Example 1 was injected thereinto to prepare a pouch-type lithium secondary battery with an operating voltage of 4.45 V or higher.

Example 6

A pouch-type lithium secondary battery was prepared in the same manner as in Example 5 except that the non-aqueous electrolyte solution of Example 2, instead of the non-aqueous electrolyte solution of Example 1, was injected.

Example 7

A pouch-type lithium secondary battery was prepared in the same manner as in Example 5 except that the non-aqueous electrolyte solution of Example 3, instead of the non-aqueous electrolyte solution of Example 1, was injected.

Example 8

A pouch-type lithium secondary battery was prepared in the same manner as in Example 5 except that the non-aqueous electrolyte solution of Example 4, instead of the non-aqueous electrolyte solution of Example 1, was injected.

Example 9

A pouch-type lithium secondary battery was prepared in the same manner as in Example 5 except that a positive electrode was prepared by using LiCoO$_2$, instead of Li(Ni$_{0.8}$Mn$_{0.1}$Co$_{0.1}$)O$_2$, as a positive electrode active material.

Example 10

A pouch-type lithium secondary battery was prepared in the same manner as in Example 6 except that a positive electrode was prepared by using LiCoO$_2$, instead of Li(Ni$_{0.8}$Mn$_{0.1}$Co$_{0.1}$)O$_2$, as a positive electrode active material.

Example 11

A pouch-type lithium secondary battery was prepared in the same manner as in Example 7 except that a positive electrode was prepared by using LiCoO$_2$, instead of Li(Ni$_{0.8}$Mn$_{0.1}$Co$_{0.1}$)O$_2$, as a positive electrode active material.

Example 12

A pouch-type lithium secondary battery was prepared in the same manner as in Example 8 except that a positive electrode was prepared by using LiCoO$_2$, instead of Li(Ni$_{0.8}$Mn$_{0.1}$Co$_{0.1}$)O$_2$, as a positive electrode active material.

Comparative Example 10

A pouch-type lithium secondary battery was prepared in the same manner as in Example 5 except that the non-aqueous electrolyte solution of Comparative Example 1, instead of the non-aqueous electrolyte solution of Example 1, was injected.

Comparative Example 11

A pouch-type lithium secondary battery was prepared in the same manner as in Comparative Example 10 except that the non-aqueous electrolyte solution of Comparative Example 2, instead of the non-aqueous electrolyte solution of Comparative Example 1, was injected.

Comparative Example 12

A pouch-type lithium secondary battery was prepared in the same manner as in Comparative Example 10 except that the non-aqueous electrolyte solution of Comparative Example 3, instead of the non-aqueous electrolyte solution of Comparative Example 1, was injected.

Comparative Example 13

A pouch-type lithium secondary battery was prepared in the same manner as in Comparative Example 10 except that the non-aqueous electrolyte solution of Comparative Example 4, instead of the non-aqueous electrolyte solution of Comparative Example 1, was injected.

Comparative Example 14

A pouch-type lithium secondary battery was prepared in the same manner as in Comparative Example 10 except that the non-aqueous electrolyte solution of Comparative Example 5, instead of the non-aqueous electrolyte solution of Comparative Example 1, was injected.

Comparative Example 15

A pouch-type lithium secondary battery was prepared in the same manner as in Comparative Example 10 except that the non-aqueous electrolyte solution of Comparative Example 6, instead of the non-aqueous electrolyte solution of Comparative Example 1, was injected.

Comparative Example 16

A pouch-type lithium secondary battery was prepared in the same manner as in Comparative Example 10 except that the non-aqueous electrolyte solution of Comparative Example 7, instead of the non-aqueous electrolyte solution of Comparative Example 1, was injected.

Comparative Example 17

A pouch-type lithium secondary battery was prepared in the same manner as in Comparative Example 10 except that a positive electrode was prepared by using $LiCoO_2$, instead of $Li(Ni_{0.8}Mn_{0.1}Co_{0.1})O_2$, as a positive electrode active material.

Comparative Example 18

A pouch-type lithium secondary battery was prepared in the same manner as in Comparative Example 11 except that a positive electrode was prepared by using $LiCoO_2$, instead of $Li(Ni_{0.8}Mn_{0.1}Co_{0.1})O_2$, as a positive electrode active material.

Comparative Example 19

A pouch-type lithium secondary battery was prepared in the same manner as in Comparative Example 12 except that a positive electrode was prepared by using $LiCoO_2$, instead of $Li(Ni_{0.8}Mn_{0.1}Co_{0.1})O_2$, as a positive electrode active material.

Comparative Example 20

A pouch-type lithium secondary battery was prepared in the same manner as in Comparative Example 13 except that a positive electrode was prepared by using $LiCoO_2$, instead of $Li(Ni_{0.8}Mn_{0.1}Co_{0.1})O_2$, as a positive electrode active material.

Comparative Example 21

A pouch-type lithium secondary battery was prepared in the same manner as in Comparative Example 14 except that a positive electrode was prepared by using $LiCoO_2$, instead of $Li(Ni_{0.8}Mn_{0.1}Co_{0.1})O_2$, as a positive electrode active material.

Comparative Example 22

A pouch-type lithium secondary battery was prepared in the same manner as in Comparative Example 15 except that a positive electrode was prepared by using $LiCoO_2$, instead of $Li(Ni_{0.8}Mn_{0.1}Co_{0.1})O_2$, as a positive electrode active material.

Comparative Example 23

A pouch-type lithium secondary battery was prepared in the same manner as in Comparative Example 16 except that a positive electrode was prepared by using $LiCoO_2$, instead of $Li(Ni_{0.8}Mn_{0.1}Co_{0.1})O_2$, as a positive electrode active material.

Comparative Example 24

A pouch-type lithium secondary battery was prepared in the same manner as in Comparative Example 10 except that a positive electrode was prepared by using $LiCoO_2$, instead of $Li(Ni_{0.8}Mn_{0.1}Co_{0.1})O_2$, as a positive electrode active material and the non-aqueous electrolyte solution of Comparative Example 8, instead of the non-aqueous electrolyte solution of Comparative Example 1, was injected.

Comparative Example 25

A pouch-type lithium secondary battery was prepared in the same manner as in Comparative Example 10 except that a positive electrode was prepared by using $LiCoO_2$, instead of $Li(Ni_{0.8}Mn_{0.1}Co_{0.1})O_2$, as a positive electrode active material and the non-aqueous electrolyte solution of Comparative Example 9, instead of the non-aqueous electrolyte solution of Comparative Example 1, was injected.

EXPERIMENTAL EXAMPLES

Experimental Example 1. Evaluation of Thickness Increase Rate After High-temperature Storage (1)

After an activation (formation) process was performed at 0.2 C rate on the lithium secondary batteries prepared in Examples 5 to 8 and Comparative Examples 10 to 16, gas in each secondary battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION Co., Ltd.) was used as the charge/discharge equipment used for the charging and discharging of the battery.

Subsequently, after each lithium secondary battery was constant current/constant voltage charged at 0.7 C rate to 4.45 V and cut-off charged at 0.05 C at room temperature (25° C.), a thickness before high-temperature storage of each lithium secondary battery was measured with a plate thickness gauge with a weight of 300 g, and the results thereof are presented in Table 2 below. In this case, a method of measuring the thickness was performed in such a manner that each battery was put on the plate thickness gauge and a value appearing when the weight of 300 g was put on the battery was checked.

Subsequently, after each of the lithium secondary batteries was stored at high temperature by being left standing in an oven (OF-02GW, manufactured by JEIO TECH. CO., LTD.) at 85° C. for 8 hours, each battery was taken out at room temperature and cooled for 24 hours, a thickness of each battery after high-temperature storage was then measured using the plate thickness gauge, and the results thereof are presented in Table 2 below.

Next, a thickness increase rate (%) of the battery after the high-temperature storage relative to the thickness of the battery before the high-temperature storage was calculated, and the results thereof are presented in Table 2 below.

TABLE 2

| | Thickness before high-temperature storage (mm) | Thickness after high-temperature storage (mm) | Thickness increase rate (%) |
|---|---|---|---|
| Example 5 | 3.251 | 3.554 | 9.3 |
| Example 6 | 3.247 | 3.381 | 4.1 |
| Example 7 | 3.249 | 3.369 | 3.7 |
| Example 8 | 3.261 | 3.547 | 8.8 |
| Comparative Example 10 | 3.251 | 3.588 | 10.4 |
| Comparative Example 11 | 3.227 | 3.542 | 9.8 |
| Comparative Example 12 | 3.232 | 3.546 | 9.7 |
| Comparative Example 13 | 3.286 | 3.699 | 12.6 |
| Comparative Example 14 | 3.292 | 3.831 | 16.4 |
| Comparative Example 15 | 3.297 | 4.165 | 26.3 |
| Comparative Example 16 | 3.304 | 3.979 | 20.4 |

Referring to Table 2, with respect to the secondary batteries of Examples 5 to 8, thickness increase rates after high-temperature storage were about 9.3% or less, wherein it may be understood that the thickness increase rates were significantly improved in comparison to those of the secondary batteries of Comparative Examples 10 to 16.

Experimental Example 2. Evaluation of Thickness Increase Rate After High-temperature Storage (2)

After an activation (formation) process was performed at 0.2 C rate on the lithium secondary batteries prepared in Examples 9 to 12 and Comparative Examples 17 to 25, gas in each secondary battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION Co., Ltd.) was used as the charge/discharge equipment used for the charging and discharging of the battery.

Subsequently, after each lithium secondary battery was constant current/constant voltage charged at 0.7 C rate to 4.45 V and cut-off charged at 0.05 C at room temperature (25° C.), a thickness before high-temperature storage of each lithium secondary battery was measured with a plate thickness gauge with a weight of 300 g, and the results thereof are presented in Table 3 below. In this case, a method of measuring the thickness was performed in such a manner that each battery was put on the plate thickness gauge and a value appearing when the weight of 300 g was put on the battery was checked.

Subsequently, after each of the lithium secondary batteries was stored at high temperature by being left standing in an oven (OF-02GW, manufactured by JEIO TECH. CO., LTD.) at 85° C. for 8 hours, each battery was taken out at room temperature and cooled for 24 hours, a thickness of each battery after high-temperature storage was then measured using the plate thickness gauge, and the results thereof are presented in Table 3 below.

Next, a thickness increase rate (%) of the battery after the high-temperature storage relative to the thickness of the battery before the high-temperature storage was calculated, and the results thereof are presented in Table 3 below.

TABLE 3

| | Thickness before high-temperature storage (mm) | Thickness after high-temperature storage (mm) | Thickness increase rate (%) |
|---|---|---|---|
| Example 9 | 3.227 | 3.440 | 6.6 |
| Example 10 | 3.224 | 3.323 | 3.1 |
| Example 11 | 3.231 | 3.274 | 1.3 |
| Example 12 | 3.245 | 3.365 | 3.7 |
| Comparative Example 17 | 3.230 | 3.464 | 7.2 |
| Comparative Example 18 | 3.214 | 3.489 | 8.6 |
| Comparative Example 19 | 3.234 | 3.461 | 7.0 |
| Comparative Example 20 | 3.264 | 3.584 | 9.8 |
| Comparative Example 21 | 3.268 | 3.635 | 11.2 |
| Comparative Example 22 | 3.266 | 3.778 | 15.7 |
| Comparative Example 23 | 3.275 | 3.732 | 14.0 |
| Comparative Example 24 | 3.252 | 3.555 | 9.3 |
| Comparative Example 25 | 3.280 | 3.748 | 14.3 |

Referring to Table 3, with respect to the secondary batteries of Examples 9 to 12, thickness increase rates after high-temperature storage were about 6.6% or less, wherein it may be understood that the thickness increase rates were significantly improved in comparison to those of the secondary batteries of Comparative Examples 17 to 25.

Experimental Example 3. Capacity Retention Evaluation (1)

After an activation (formation) process was performed at 0.2 C rate on the lithium secondary batteries prepared in Examples 5 to 8 and Comparative Examples 10 to 16, gas in each secondary battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION Co., Ltd.) was used as the charge/discharge equipment used for the charging and discharging of the battery.

Subsequently, 200 cycles of a charge and discharge process, in which charging of each lithium secondary battery at 1.0 C rate to 4.45 V under a constant current/constant voltage condition at a high temperature (45° C.), cut-off charging at 0.05 C, and cut-off discharging at a constant current of 1.0 C rate to 3.0 V were set as one cycle, were performed using the charge/discharge equipment.

Subsequently, discharge capacity after 200 cycles was measured, capacity retention was calculated as a percentage (%) of a discharge capacity value at a $200^{th}$ cycle relative to 2,210 mAh, theoretical capacity of the corresponding cell, and the results thereof are presented in Table 4 below.

TABLE 4

| | Discharge capacity (mAh) after 200 cycles | Capacity retention (%) |
|---|---|---|
| Example 5 | 2051.1 | 92.8 |
| Example 6 | 2134.4 | 96.6 |
| Example 7 | 2113.6 | 95.6 |
| Example 8 | 2064.0 | 93.4 |
| Comparative Example 10 | 2042.4 | 92.4 |
| Comparative Example 11 | 2030.2 | 91.9 |
| Comparative Example 12 | 1973.6 | 89.3 |
| Comparative Example 13 | 1895.8 | 85.8 |
| Comparative Example 14 | 1835.9 | 83.1 |
| Comparative Example 15 | 1805.1 | 81.7 |
| Comparative Example 16 | 1686.8 | 76.3 |

Referring to Table 4, discharge capacity retentions after 200 cycles of the secondary batteries of Examples 5 to 8 were about 92.8% or more, wherein it may be understood that the discharge capacity retentions after 200 cycles were improved in comparison to those of the secondary batteries of Comparative Examples 10 to 16.

Experimental Example 4. Capacity Retention Evaluation (2)

After an activation (formation) process was performed at 0.2 C rate on the lithium secondary batteries prepared in Examples 9 to 12 and Comparative Examples 17 to 25, gas in each secondary battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION Co., Ltd.) was used as the charge/discharge equipment used for the charging and discharging of the battery.

Subsequently, 200 cycles of a charge and discharge process, in which charging of each lithium secondary battery at 1.0 C rate to 4.45 V under a constant current/constant voltage condition at a high temperature (45° C.), cut-off charging at 0.05 C, and cut-off discharging at a constant current of 1.0 C rate to 3.0 V were set as one cycle, were performed using the charge/discharge equipment.

Subsequently, discharge capacity after 200 cycles was measured, capacity retention was calculated as a percentage (%) of a discharge capacity value at a 200$^{th}$ cycle relative to 2,210 mAh, theoretical capacity of the corresponding cell, and the results thereof are presented in Table 5 below.

TABLE 5

| | Discharge capacity (mAh) after 200 cycles | Capacity retention (%) |
|---|---|---|
| Example 9 | 2076.4 | 94.0 |
| Example 10 | 2184.7 | 98.9 |
| Example 11 | 2156.0 | 97.6 |
| Example 12 | 2088.3 | 94.5 |
| Comparative Example 17 | 2064.5 | 93.4 |
| Comparative Example 18 | 2037.1 | 92.2 |
| Comparative Example 19 | 2053.5 | 92.9 |
| Comparative Example 20 | 2028.2 | 91.8 |
| Comparative Example 21 | 2022.5 | 91.5 |
| Comparative Example 22 | 2015.9 | 91.2 |
| Comparative Example 23 | 1987.6 | 89.9 |
| Comparative Example 24 | 2019.7 | 91.4 |
| Comparative Example 25 | 1955.5 | 88.5 |

Referring to Table 5, discharge capacity retentions after 200 cycles of the secondary batteries of Examples 9 to 12 were about 94.0% or more, wherein it may be understood that the discharge capacity retentions after 200 cycles were improved in comparison to those of the secondary batteries of Comparative Examples 17 to 25.

Experimental Example 5. Evaluation of High-Temperature Lifetime Co Dissolution Amount After an activation (formation) process was performed at 0.2 C rate on the lithium secondary batteries prepared in Examples 9 to 12 and the lithium secondary batteries prepared in Comparative Examples 17 and 20 to 23, gas in each secondary battery was removed through a degassing process.

3 cycles of an initial charge and discharge process, in which charging of each lithium secondary battery having gas removed therefrom at 0.2 C rate to 4.45 V under a constant current/constant voltage condition at room temperature (25° C.), cut-off charging at 0.05 C, and discharging at 0.2 C rate to 3.0 V were set as one cycle, were performed using charge/discharge equipment. In this case, PNE-0506 charge/discharge equipment (manufacturer: PNE SOLUTION Co., Ltd.) was used as the charge/discharge equipment used for the charging and discharging of the battery.

Subsequently, 100 cycles of a charge and discharge process, in which charging of each lithium secondary battery at 1.0 C rate to 4.45 V under a constant current/constant voltage condition at a high temperature (45° C.), cut-off charging at 0.05 C, and cut-off discharging at a constant current of 1.0 C rate to 3.0 V were set as one cycle, were performed using the charge/discharge equipment.

Subsequently, the cell was disassembled after being discharged after 100 cycles, one sheet of the negative electrode was sampled and washed thoroughly with a dimethyl carbonate (DMC) solution, the negative electrode active material was then scraped off and inductively-coupled plasma (ICP) analysis (ICP-OES (PERKIN-ELMER, OPTIMA 5300DV)) was performed to measure a concentration of cobalt (Co) (Co dissolution amount) which was dissolved from the positive electrode and reduced and electrodeposited on the negative electrode due to the degradation of the positive electrode and the side reaction with the electrolyte solution at high voltage, and the results thereof are presented in Table 6 below.

TABLE 6

| | Concentration of Co dissolved after 100 cycles (mg/kg) |
|---|---|
| Example 9 | 127 |
| Example 10 | 108 |
| Example 11 | 106 |
| Example 12 | 105 |
| Comparative Example 17 | 132 |
| Comparative Example 20 | 158 |
| Comparative Example 21 | 173 |
| Comparative Example 22 | 224 |
| Comparative Example 23 | 180 |

Referring to Table 6, with respect to the secondary batteries prepared in Examples 9 to 12 which included the non-aqueous electrolyte solution composition of the present invention, it may be understood that Co concentrations (Co dissolution amounts) were reduced in comparison to those of the secondary batteries prepared in Comparative Examples 17 and 20 to 23. Referring to these results, it may be confirmed that a secondary battery, in which battery capacity degradation and electrolyte side reaction are suppressed, may be prepared when the non-aqueous electrolyte solution of the present invention is present.

The invention claimed is:

1. A non-aqueous electrolyte solution for a lithium secondary battery, the non-aqueous electrolyte solution comprising:
    a lithium salt;
    an organic solvent containing a carbonate compound and a propionate compound; and
    an additive consisting of a first additive, a second additive, and a third additive,
    wherein the first additive is a compound represented by Formula 1,
    the second additive is 1,3,6-hexanetricarbonitrile,
    the first additive and the second additive are present in a weight ratio of 1:1.1 to 1:5, and
    the third additive is vinylene carbonate, vinylethylene carbonate, fluoroethylene carbonate (FEC), lithium oxalyldifluoroborate (LiODFB), or a combination thereof:

NC—R—CH=CH—R—CN  [Formula 1]

wherein, in Formula 1,
    R is an unsubstituted or substituted alkylene group having 1 to 5 carbon atoms.

2. The non-aqueous electrolyte solution for a lithium secondary battery of claim 1, wherein the carbonate compound comprises at least one of a cyclic carbonate compound or a linear carbonate compound.

3. The non-aqueous electrolyte solution for a lithium secondary battery of claim 2, wherein the cyclic carbonate compound is at least one selected from the group consisting of ethylene carbonate and propylene carbonate.

4. The non-aqueous electrolyte solution for a lithium secondary battery of claim 1, wherein the propionate compound is at least one selected from the group consisting of methyl propionate, ethyl propionate, propyl propionate, and butyl propionate.

5. The non-aqueous electrolyte solution for a lithium secondary battery of claim 1, wherein the carbonate compound and the propionate compound are present in a volume ratio of 1:9 to 4:6.

6. The non-aqueous electrolyte solution for a lithium secondary battery of claim 1, wherein the compound represented by Formula 1 is 1,4-dicyano-2-butene.

7. The non-aqueous electrolyte solution for a lithium secondary battery of claim 1, wherein the compound represented by Formula 1 is present in an amount of 0.01 wt % to 2.5 wt % based on a total weight of the non-aqueous electrolyte solution.

8. The non-aqueous electrolyte solution for a lithium secondary battery of claim 1, wherein the first additive and the second additive are present in a weight ratio of 1:1.5 to 1:4.

9. The non-aqueous electrolyte solution for a lithium secondary battery of claim 1, wherein a total amount of the first additive and the second additive is in a range of 0.2 wt % to 8 wt % based on a total weight of the non-aqueous electrolyte solution.

10. A lithium secondary battery comprising:
    a positive electrode including a positive electrode active material;
    a negative electrode including a negative electrode active material;
    a separator disposed between the negative electrode and the positive electrode; and
    the non-aqueous electrolyte solution for a lithium secondary battery of claim 1.

11. The lithium secondary battery of claim 10, wherein the positive electrode active material comprises at least one of a lithium-cobalt oxide, a lithium-manganese-based oxide, or a lithium-nickel-manganese-cobalt-based oxide.

12. The lithium secondary battery of claim 11, wherein the positive electrode active material comprises at least one of the lithium-cobalt oxide or the lithium-nickel-manganese-cobalt-based oxide.

13. The lithium secondary battery of claim 11, wherein the lithium-nickel-manganese-cobalt-based oxide comprises at least one of $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$.

* * * * *